Patented May 9, 1950

2,507,153

UNITED STATES PATENT OFFICE 2,507,153

PROCESS FOR REFINING COPOLYMERIC BEADS OF ISOPROPENYL ACETATE AND FUMARIC ACID ALKYL ESTERS

William M. Gearhart and Harry R. McAmis, Kingsport, Tenn., assignors to Eastman Kodak Company, Rochester, N. Y., a corporation of New Jersey No Drawing. Application July 31, 1946, Serial No. 687,540

6 Claims. (Cl. 260—29.6)

This invention relates to a process for the manufacture of improved copolymers of isopropenyl acetate and fumaric acid alkyl esters. More particularly, it relates to a process for extracting residual monomers or dimers from copolymers of isopropenyl acetate and one or more dialkyl fumarates in bead or granular form, and to a process whereby the extracted beads or granules are plasticized by further treatment in a liquid mixture which is a non-solvent for the beads or granules, but which contains a substantial amount of a plasticizer having affinity for the beads and granules.

It is known that various polymers can be freed from residual monomers or reagents by extraction with organic liquids which are non-solvents for the polymer. For example, in the polymerization of acrolein and maleic acid ester, the unchanged maleic acid ester can be removed from the copolymer by extraction with alcohol. Similarly, a copolymer of styrene and maleic anhydride upon esterification with an excess of a fatty alcohol can be extracted with hot alcohol to remove the excess fatty alcohol. It is also known that propylene-sulphur dioxide-methyl methacrylate polymer in the form of a ground powder can be purified by extraction with an 80:20 methanol-acetone mixture. Fusible polymers of polyalcohol acrylates can be converted to infusible products with greater facility by removal of the monomeric acrylates by extraction of the voluminous precipitates with methyl or ethyl alcohol; copolymers of isobutylene and butadiene can be extracted with benzene or ethylene dichloride to remove lower molecular weight products; and copolymers of maleic anhydride and ethylene can be freed of unreacted maleic anhydride by extraction with hot benzene. However, none of these processes were concerned with the larger particle size and more compact polymeric beads and granules which are obtained in polymerizations wherein the polymerizable materials are suspended in a non-solvent, in the presence of a relatively poor dispersing agent, and vigorously agitated, stirred or tumbled, until the separate droplets become completely polymerized. Such beads or granules are easily separable from the liquid suspensions, but tend to retain some of the original monomers and other materials which make up the solution. In the extraction of such polymeric beads or granules, the extraction medium must necessarily be specific in affinity for the monomers and polymers concerned so that the effect obtained will be a maximum of swelling and penetration of the beads or granules, but without the beads actually losing their identity by solvation or adhesion into difficultly workable masses.

We have now found that beads obtained by copolymerization of isopropenyl acetate and fumaric acid alkyl esters can be materially improved in physical properties by extraction of the crude copolymeric beads with liquid mediums which are solvents for the occluded monomers, but only swelling agents for the beads, for example, methanol-water or acetic acid-water mixtures. We have found further that by dissolving a plasticizer having affinity for the copolymeric beads in similar alcohol-water mixtures and treating the previously extracted and still swollen undried beads with the mixture, the beads readily absorb plasticizer from the mixture and become uniformly plasticized. The plastics made from beads which have been treated by our process are substantially free from monomer odors and have greatly improved physical properties, for example, greater hardness, tensile strength and heat stability, over plastics made from the original untreated copolymeric beads. Our process of extraction also makes possible the utilization of beads from mixtures incompletely polymerized, i. e. beads containing a large percentage of the monomers and dimers formed by side reactions, which in that form are too soft, tacky and having objectionable odors or corrosive action on molds and dies for practical use. It is possible by our process, therefore, to arrest the polymerization at any stage where beads have formed and to recover such beads in usable form.

The composition of the extraction medium of methanol-water or acetic acid-water is subject to some variation depending upon the specific copolymeric beads to be extracted. For example, copolymeric beads of isopropenyl acetate-dimethyl and diethyl fumarates are more solvent resistant than the copolymeric beads of isopropenyl acetate-diethylfumarate or isopropenyl acetate-diisopropylfumarate. In the former case, a mixture containing from 90 to 98 per cent by volume of methanol and 10 to 2 per cent by volume of water is an effective extractant, while in the latter a mixture of from 70 to 80 per cent by volume of methanol and 30 to 20 per cent by volume of water gives the best results. The most efficient extraction can be carried out using mixtures having the maximum solvent power without actually causing the beads to adhere together. The ratios of extractant to polymer can range between 2 to 4 for the former and 1 for the latter. The time of extraction can vary between 4 to 20 hours at room temperature, but preferably about 6 hours for moderately good extraction. The temperature of extraction can range from about 15 to 35° C. for the preferred mixtures. In the practice of our process, the beads are usually added to the rapidly agitated extraction medium. After about 4 hours, water is added to a point where the beads will harden slightly and not stick when the agitation is stopped. When using the methanol-water mixture, the concentration of methanol should not drop below 60 per cent by volume, since at lower concentrations the reprecipitation of low molecular weight material may occur. In general, a single extraction gives a substantial improvement, but it has been found that a double extraction will give more consistent improvement.

It is, accordingly, an object of the invention to provide a process for preparing improved copolymeric beads of isopropenyl acetate-fumaric acid alkyl esters. Other objects will become apparent by a reading of the specification. The following examples will serve to illustrate further the method of improving the quality of the specific copolymeric beads of our invention.

*Example 1.—Extraction of copolymeric beads of isopropenyl acetate-dimethyl fumarate-diethyl fumarate*

1000 grams of beads made by polymerization of a mixture of isopropenyl acetate, dimethyl fumarate and diethyl fumarate are added to 3000 grams of a rapidly agitated mixture by volume of 98 per cent methanol and 2 per cent water, at room temperature. After a period of about 4-5 hours, the solution was diluted with water to 80 per cent of methanol by volume. The agitation was continued for another hour, after which the beads were filtered off and dried. The results of tests on injection molded specimens showed improvements such as greater hardness and tensile strength, higher flow temperature, freedom from odor and a higher intrinsic viscosity.

*Example 2.—Extraction of copolymeric beads of isopropenyl acetate-diisopropyl fumarate*

1000 grams of beads made by polymerization of a mixture of isopropenyl acetate and diisopropyl fumarate were added to a rapidly agitated mixture by volume of 80 per cent methanol and 20 per cent water, at room temperature. The agitation was continued for about 6 hours, after which the extracted beads were filtered off and dried. The results of tests on injection molded specimens showed improvements in greater hardness, higher flow temperature, freedom from odor and higher intrinsic viscosity.

*Example 3.—Extraction and plasticization of copolymeric beads of isopropenyl acetate-fumaric acid alkyl ester*

Beads prepared by polymerization of isopropenyl acetate and a fumaric acid alkyl ester such as dimethyl fumarate, diethyl fumarate or diisopropyl fumarate were double extracted by the methods and concentrations described in the preceding examples. In each case, the beads were filtered off in a swollen condition, and without drying, placed in a mixture made up of 80 per cent by volume of methanol and 20 per cent by volume of water, and containing about from 3 to 8 grams of dibutyl phthalate in each 100 c. c. of the mixture. In a short time, the beads become uniformly plasticized by the dibutyl phthalate, after which the solvent was flashed off and the beads used directly for molding purposes.

The following Table I illustrates the improvement obtained by extracting the specified copolymer in the indicated solvent mixture. Column 1 gives the copolymer, for example, I. P. A. is the abbreviation for isopropenyl acetate, D. E. F. is the abbreviation for diethyl fumarate, D. M. F. is the abbreviation for dimethyl fumarate and D. I. P. F. is the abbreviation for diisopropyl fumarate. The physical constants of Rockwell hardness given in column 4 and the tensile strength given in column 5 were obtained on plastic samples molded from the respective beads listed in the table.

*Table I*

| Copolymer | Extractant | Time of Extraction, Hours | Rockwell Hardness | Tensile Strength |
|---|---|---|---|---|
| IPA/DEF/DMF | None | 6 | 71.2 | 5,220 |
| Do | 90% Methanol | 6 | 88.0 | 6,600 |
| IPA/DIPF | None | 4 | 70.0 | 4,940 |
| Do | 80% Methanol | 4 | 77.2 | 5,160 |
| IPA/DEF | None | 4 | 62.0 | 5,210 |
| Do | 82% Methanol | 4 | 78.6 | 5,480 |

The proportion of the monomers entering into the copolymer can be varied within fairly wide limits without seriously altering the solubility characteristics of the copolymeric beads obtained.

However the copolymeric beads prepared from 1 to 3 molecular parts of isopropenyl acetate and from 3 to 1 molecular parts of the unsaturated polymerizable organic compound in the starting polymerization mixtures are preferred for the most efficient application of our refining process. The process for the production of copolymeric resins of isopropenyl aceate and a fumaric acid alkyl ester in the form of beads or granules is described in copending application of J. J. Gordon, Serial No. 584,004, filed March 21, 1945, and now abandoned.

What we claim is:

1. A process for refining and removing occluded monomers from copolymeric beads of isopropenyl acetate and a fumaric acid alkyl ester, said alkyl group being saturated and having not more than 3 carbon atoms, which comprises soaking at 15° to 35° C., 1 part by weight of the beads with 2 to 4 parts by weight of a liquid mixture of 70 to 98 per cent by volume of methanol and 30 to 2 per cent by volume of water, and then separating the soaked beads from the liquid.

2. A process for refining and removing occluded monomers from copolymeric beads of isopropenyl acetate, dimethyl fumarate and diethyl fumarate, which comprises soaking at 15° to 35° C., 1 part by weight of the beads with 2 to 4 parts by weight of a liquid mixture of 90 to 98 per cent by volume of methanol and 10 to 2 per cent by volume of water, and then separating the soaked beads from the liquid.

3. A process for refining and removing occluded monomers from copolymeric beads of isopropenyl acetate and diisopropyl fumarate, which comprises soaking at 15° to 35° C., 1 part by weight of the beads with 2 to 4 parts by weight of a liquid mixture of 70 to 80 per cent by volume of methanol and 30 to 20 per cent by volume of water, and then separating the soaked beads from the liquid.

4. A process for refining, removing occluded monomers from and plasticizing copolymeric beads of isopropenyl acetate and a fumaric acid alkyl ester, said alkyl group being saturated and having not more than 3 carbon atoms, which comprises soaking at 15° to 35° C., 1 part by weight of the beads with 2 to 4 parts by weight of a liquid mixture of 70 to 98 per cent by volume of methanol and 30 to 2 per cent by volume of water, separating the soaked beads from the liquid, and then soaking the soaked beads at 15° to 35° C., with an 80-20 per cent by volume methanol-water solution containing 5 per cent of a dialkyl phthalate.

5. A process for refining, removing occluded monomers from and plasticizing copolymeric beads of isopropenyl acetate, dimethyl fumarate and diethyl fumerate, which comprises soaking at 15° to 35° C., 1 part by weight of the beads with 2 to 4 parts by weight of a liquid mixture of 90-98 per cent by volume of methanol and 10 to 2 per cent by volume of water, separating the soaked beads from the liquid, then soaking the soaked beads at 15° to 35° C., with an 80-20 per cent by volume methanol-water solution containing from 3 to 8 per cent of dibutyl phthalate, and then separating the plasticized beads from the solution.

6. A process for refining, removing occluded monomers from and plasticizing copolymeric beads of isopropenyl acetate and diisopropyl fumarate, which comprises soaking at 15° to 35° C., 1 part by weight of the beads with 2 to 4 parts by weight of a liquid mixture of 70 to 80 per cent by volume of methanol and 30 to 20 per cent by volume of water, separating the soaked beads from the liquid, then soaking the soaked beads at 15° to 35° C., with an 80-20 per cent by volume methanol-water solution containing from 3 to 8 per cent of dibutyl phthalate, and then separating the plasticized beads from the solution.

WILLIAM M. GEARHART.
HARRY R. McAMIS.

REFERENCES CITED

The following references are of record in the file of this patent:

UNITED STATES PATENTS

| Number | Name | Date |
|---|---|---|
| 2,245,708 | Patton | June 17, 1941 |
| 2,255,729 | Britton et al. | Sept. 9, 1941 |
| 2,354,210 | Jacobson | July 25, 1944 |
| 2,448,531 | Kenyon et al. | Sept. 7, 1948 |

OTHER REFERENCES

Gwynn et al.: Jour. Am. Chem. Soc. 64, 2216-18 (1942); Abst. in C. A. 36, 6498.